US012742661B2

(12) United States Patent
Chen et al.

(10) Patent No.: US 12,742,661 B2
(45) Date of Patent: Sep. 22, 2026

(54) METHODS AND SYSTEMS FOR DISTRIBUTING HIGH DEFINITION MAP USING EDGE DEVICE

(71) Applicant: Toyota Motor Engineering & Manufacturing North America, Inc., Plano, TX (US)

(72) Inventors: Dawei Chen, Mountain View, CA (US); Haoxin Wang, Mountain View, CA (US); Kyungtae Han, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 279 days.

(21) Appl. No.: 17/896,396

(22) Filed: Aug. 26, 2022

(65) Prior Publication Data

US 2024/0068838 A1 Feb. 29, 2024

(51) Int. Cl.

| | |
|---|---|
| ***G01C 21/00*** | (2006.01) |
| ***G08G 1/0962*** | (2006.01) |
| ***G08G 1/0967*** | (2006.01) |

(52) U.S. Cl.

CPC ..... *G01C 21/3896* (2020.08); *G01C 21/3889* (2020.08); *G08G 1/0962* (2013.01); *G08G 1/096766* (2013.01)

(58) Field of Classification Search

CPC ............ G01C 21/3896; G01C 21/3889; G08G 1/0962; G08G 1/096766

See application file for complete search history.

(56) References Cited

U.S. PATENT DOCUMENTS

| | | | | |
|---|---|---|---|---|
| 10,841,240 | B2 | 11/2020 | Todd et al. | |
| 10,867,509 | B2 | 12/2020 | Hassnaa et al. | |
| 10,911,412 | B2 | 2/2021 | Kim et al. | |
| 11,039,185 | B2 | 6/2021 | Rieger et al. | |
| 11,068,516 | B2 | 7/2021 | Wheeler | |
| 11,092,970 | B2 | 8/2021 | Herman et al. | |
| 2019/0323855 | A1 | 10/2019 | Mahler et al. | |
| 2019/0325737 | A1* | 10/2019 | Moustafa | G01C 21/3881 |
| 2021/0207971 | A1* | 7/2021 | Kim | G01C 21/365 |
| 2021/0368308 | A1* | 11/2021 | Katardjiev | H04L 67/131 |
| 2022/0115783 | A1* | 4/2022 | Tran | H04L 9/50 |

FOREIGN PATENT DOCUMENTS

| | | | |
|---|---|---|---|
| CN | 108447291 | B | 8/2020 |
| CN | 111006680 | B | 12/2020 |
| CN | 113496602 | A | 10/2021 |
| WO | 2021103514 | A1 | 6/2021 |

* cited by examiner

*Primary Examiner* — Ian Jen

(74) *Attorney, Agent, or Firm* — Dinsmore & Shohl LLP

(57) ABSTRACT

An edge device for providing an HD map to a vehicle is provided. The edge device includes a controller programmed to obtain an HD map request including a task type from a vehicle, obtain a status of a wireless channel between the vehicle and the edge device, determine an HD map version among a plurality of versions based on the status of the wireless channel and the task type, and transmit the determined HD map version to the vehicle.

18 Claims, 9 Drawing Sheets

| TASK TYPE | NEEDED INFORMATION | EXAMPLE |
|---|---|---|
| PATH PLANNING | DEPARTURE LOCATION | 37°23'19.8"N 122°02'56.9"W |
| | DESTINATION LOCATION | 37°23'24.2"N 122°03'05.6"W |
| | ROAD MAP OF THE CITY | N/A |
| REAL-TIME PATH MONITORING | TRAFFIC OF THE PLANNED PATH | 5 VEHICLES PER MILE |
| | ACCIDENT LOCATION | 37°23'24.2"N 122°03'05.6"W |
| | WEATHER OF THE PLANNED PATH | RAIN, FOG, SUNNY, STORM... |
| SAFETY GUARD | THE LOCATION OF SURROUNDING PEDESTRIANS AND VEHICLES | 37°23'24.2"N 122°03'05.6"W |
| | THE SPEED OF SURROUNDING VEHICLES | 10 MPH, 30MPH... |
| | THE DISTANCE OF SURROUNDING VEHICLES | 1 MILE, 10 MILE... |
| LANE CHANGING | THE SPEED OF SURROUNDING VEHICLES | 10 MPH, 30MPH... |
| | THE DISTANCE OF SURROUNDING VEHICLES | 1 MILE, 10 MILE... |
| | CURRENT SPEED | 10 MPH, 30MPH... |
| | CURRENT WEATHER | RAIN, FOG, SUNNY, STORM... |
| | SPEED LIMIT | 50MPH... |

FIG. 4

| PARAMETER | EXAMPLE |
|---|---|
| VEHICLE SPEED | 50 MPH, 60 MPH... |
| VEHICLE POSITION | 37.788, -122.406... |
| WEATHER | RAIN, FOG, SUNNY, STORM... |
| TRAFFIC | 5 VEHICLES PER MILE |
| REQUESTED RANGE | $10m^2$... |
| TASK TYPE | PATH PLANNING... |
| SPEED LIMIT | 50 MPH, 60 MPH... |
| SURROUNDING VEHICLE SPEED | 50 MPH, 60 MPH... |
| SURROUNDING VEHICLE POSITION | 37.788, -122.406... |
| ROAD CONDITION | ROAD WORK AHEAD OR NOT |

FIG. 5

METHODS AND SYSTEMS FOR DISTRIBUTING HIGH DEFINITION MAP USING EDGE DEVICE

TECHNICAL FIELD

The present disclosure relates to a high definition (HD) map delivery system, and more particularly, to methods and systems for determining an HD map version based on a communication channel status and a type of task and delivering the determined HD map version to a vehicle using an edge device.

BACKGROUND

A high-definition (HD) map is a highly accurate map used in autonomous driving. The HD map contains details not normally present on traditional maps. The HD map is overlaid with various information including traffic situation, access ways, accidents, etc. The HD map has high resolution, e.g., precision at a centimeter level with frequent updates.

However, wireless communication channel status between a vehicle and an edge server (e.g., a limited bandwidth or a fluctuated transmission rate) cannot meet the requirements for high-speed transmission depending on different vehicle speeds, the number of vehicles, weather, etc. This may result in delay for HD map delivery and cause traffic accidents. Therefore, systems and methods for delivering different sizes of HD maps depending on the communication channel status are desired.

SUMMARY

According to one embodiment of the present disclosure, an edge device for providing an HD map to a vehicle is provided. The edge device includes a controller programmed to obtain an HD map request including a task type from a vehicle, obtain a status of a wireless channel between the vehicle and the edge device, determine an HD map version among a plurality of versions based on the status of the wireless channel and the task type, and transmit the determined HD map version to the vehicle.

According to another embodiment of the present disclosure, a method for providing an HD map to a vehicle is provided. The method includes obtaining an HD map request including a task type from a vehicle, obtaining a status of a wireless channel between the vehicle and an edge device, determining an HD map version among a plurality of versions based on the status of the wireless channel and the task type, and transmitting the determined HD map version to the vehicle.

According to another embodiment of the present disclosure, a system for providing an HD map to a vehicle is provided. The system includes a vehicle, and an edge device. The edge device includes a controller programmed to obtain an HD map request including a task type from the vehicle, obtain a status of a wireless channel between the vehicle and the edge device, determine an HD map version among a plurality of versions based on the status of the wireless channel and the task type, and transmit the determined HD map version to the vehicle. The vehicle drives autonomously based on the determined HD map version.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 4 illustrates various task types to be performed by vehicles, according to one or more embodiments shown and described herein;

FIG. 5 depicts specific parameters and examples that are needed for an HD map, according to one or more embodiments shown and described herein;

DETAILED DESCRIPTION

Figure 1:
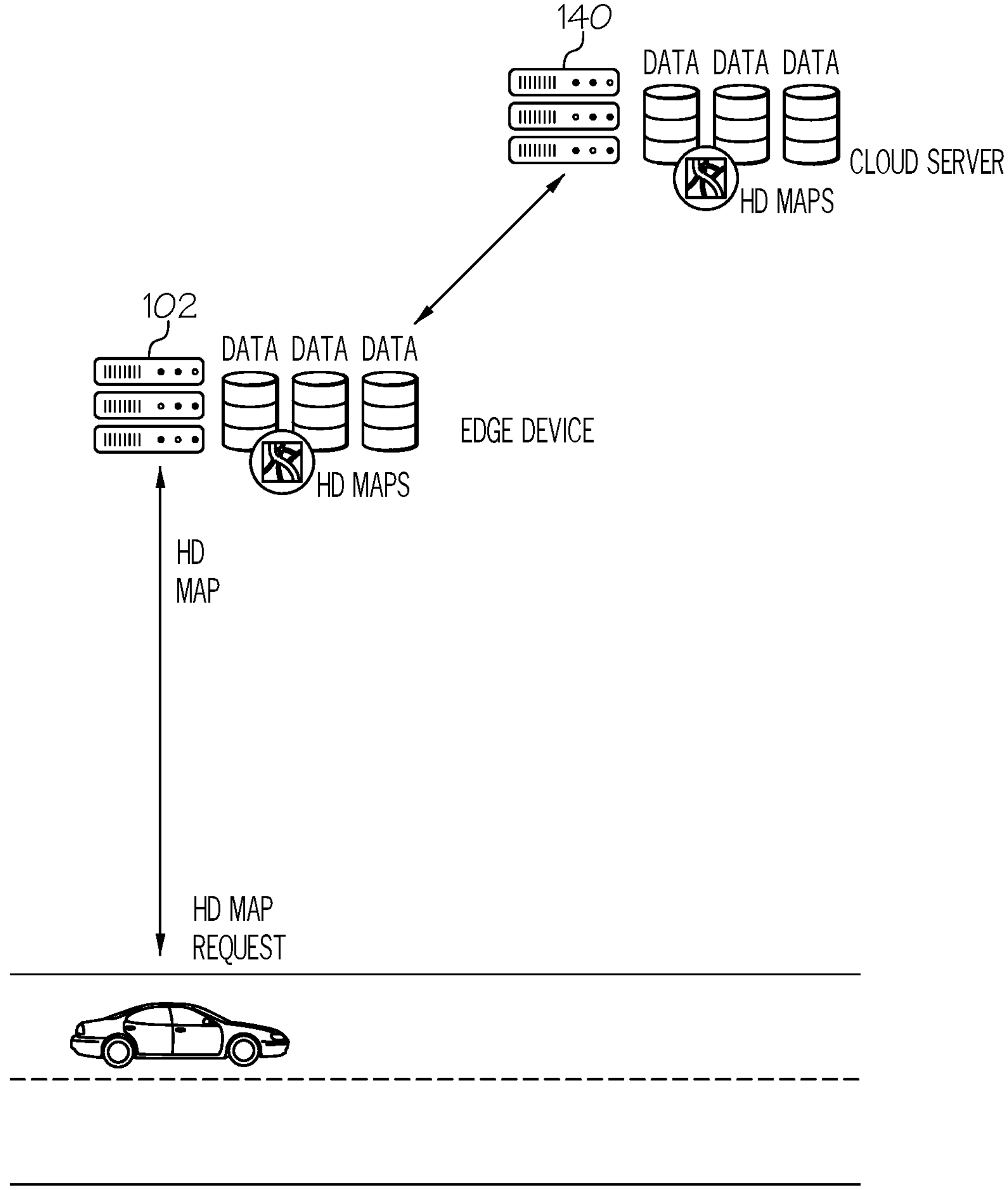
FIG. 1 depicts an example system where an edge device provides an HD map to a vehicle, according to one or more embodiments shown and described herein.

The present disclosure provides a system for delivering an HD map to a vehicle. The system includes a vehicle and an edge device. The vehicle transmits a request for an HD map for performing a certain task for autonomous driving. The edge device receives an HD map request including one or more task types from a vehicle, obtains a status of a wireless channel between the vehicle and the edge device, determines an HD map version among a plurality of versions based on the status of the wireless channel and the one or more task types, and transmits the determined HD map version to the vehicle. The present system provides optimal HD map data to a vehicle based on the task type requested by the vehicle and the wireless communication channel status between an edge device and the vehicle. In this regard, the edge device may provide appropriate HD map data to the vehicle by the deadline specified by the vehicle FIG. 1 depicts an example system where an edge device provides an HD map to a vehicle, according to one or more embodiments shown and described herein. The system may include a vehicle 100, an edge device 102, and a cloud server 140.

The vehicle 100 may be a vehicle including an automobile or any other passenger or non-passenger vehicle such as, for example, a terrestrial, aquatic, and/or airborne vehicle. In embodiments, the vehicle 100 may be an autonomous driving vehicle. In some embodiment, the vehicle 100 may be an unmanned aerial vehicle (UAV), commonly known as a drone.

The vehicle 100 may contain one or more driving assist components (e.g., autonomous driving, CACC, etc.) and one or more radios to communicate with other vehicles and/or infrastructure. The vehicle 100 may establish wireless connectivity with the edge device 102 and/or other infrastructure such as a cloud server. The vehicle 100 may autonomously drive following a route to a destination.

In embodiments, the vehicle 100 may request, from the edge device 102, an HD map corresponding to a route that the vehicle is currently driving or is going to follow. The edge device 102 receives the request from the vehicle 100 and determines what version of an HD map may be transmitted to the vehicle 100. The request may include information about a type of a task that the vehicle 100 is going to perform and deadline information for the transmission of the HD map. For example, the task may be one of a path planning task, a real-time path monitoring task, a safety guard task, and a lane changing task. The edge device 102 obtains a status of a wireless channel between the vehicle 100 and the edge device 102. The edge device 102 determines an HD map version among a plurality of versions based on the status of the wireless channel and the task type. The plurality of versions may include different sizes of HDs. The details of determining an HD map version among a plurality of versions may be described below with reference to FIGS. 3-7. Once the HD map version is determined, the edge device 102 transmits the determined HD map version to the vehicle 100.

In embodiments, the edge device 102 determines whether the determined HD map version is stored in the database in the edge device 102. If the determined HD map version is stored in the database in the edge device 102, the edge device 102 transmits the determined HD map version in the database to the vehicle 100. If the determined HD map version is not stored in the database in the edge device 102, the edge device 102 requests the determined HD map version from the cloud server 140 and receives the determined HD map version from the cloud server 140.

While FIG. 1 illustrates that the vehicle 100 communicates with the edge device 102, the vehicle 100 may wirelessly communicate with the cloud server 140. The vehicle 100 may receive an HD map directly from the cloud server 140. In some embodiments, the vehicle 100 may receive the HD map from other vehicles who store the corresponding HD map and are within a communication range of the vehicle 100.

Figure 2:
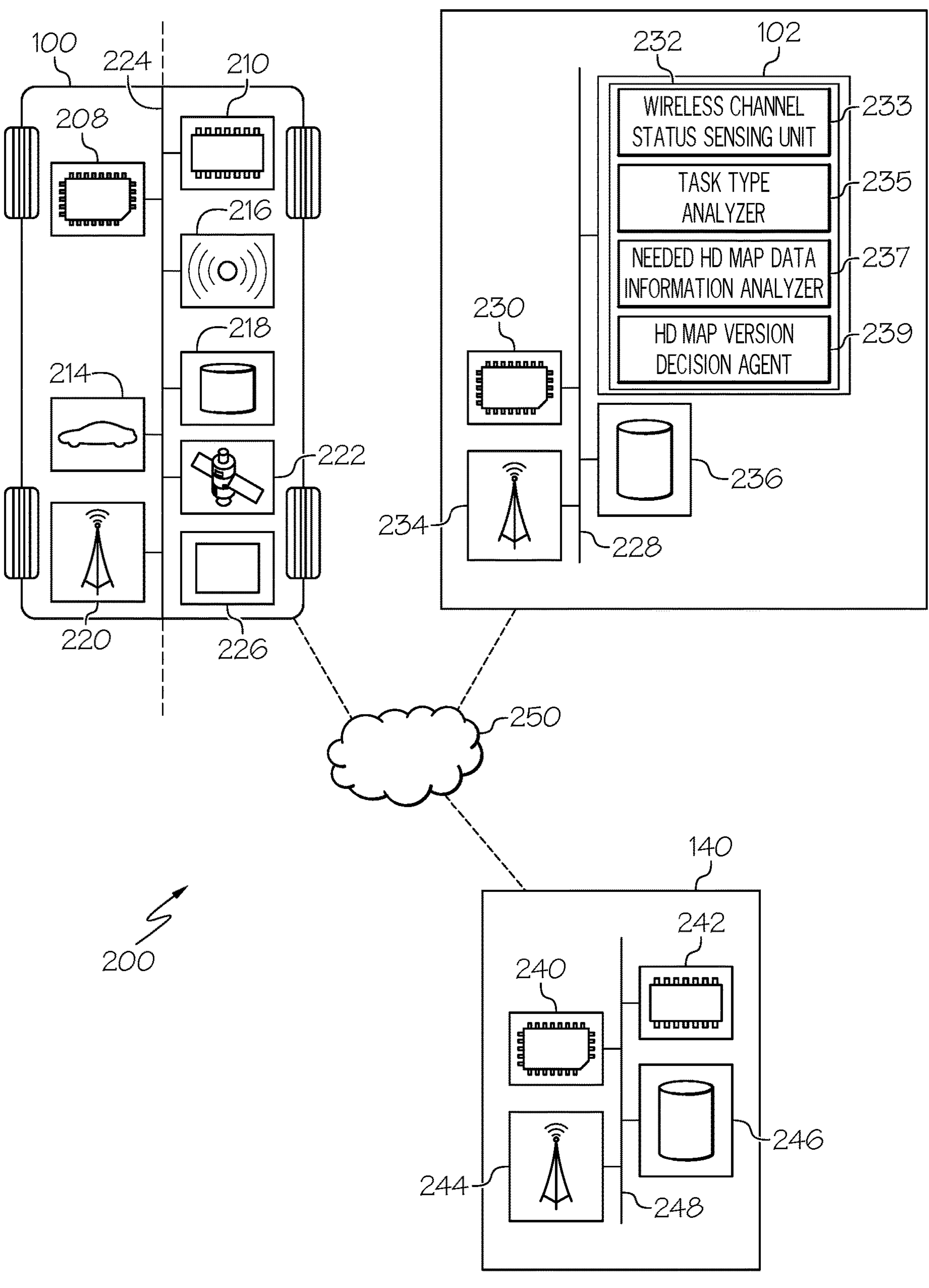
FIG. 2 depicts a schematic diagram of an example system, according to one or more embodiments shown and described herein.

Referring now to FIG. 2, a schematic diagram of an example system 200 is depicted. In particular, the vehicle 100, the edge device 102, and the cloud server 140 are depicted. The vehicle 100 may include a processor component 208, a memory component 210, a driving assist component 214, a sensor component 216, a vehicle connectivity component 218, a communication module 220, a satellite component 222, and an interface 226. The vehicle 100 also may include a communication path 224 that communicatively connects the various components of the vehicle 100.

The processor component 208 may include one or more processors that may be any device capable of executing machine readable and executable instructions. Accordingly, each of the one or more processors of the processor component 208 may be a controller, an integrated circuit, a microchip, or any other computing device. The processor component 208 is coupled to the communication path 224 that provides signal connectivity between the various components of the connected vehicle. Accordingly, the communication path 224 may communicatively couple any number of processors of the processor component 208 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 224 may be formed from any medium that is capable of transmitting a signal such as, e.g., conductive wires, conductive traces, optical waveguides, and the like. In some embodiments, the communication path 224 may facilitate the transmission of wireless signals, such as Wi-Fi, Bluetooth®, Near-Field Communication (NFC), and the like. Moreover, the communication path 224 may be formed from a combination of mediums capable of transmitting signals. In one embodiment, the communication path 224 comprises a combination of conductive traces, conductive wires, connectors, and buses that cooperate to permit the transmission of electrical data signals to components such as processors, memories, sensors, input devices, output devices, and communication devices. Accordingly, the communication path 224 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory component 210 is coupled to the communication path 224 and may contain one or more memory modules comprising RAM, ROM, flash memories, hard drives, or any device capable of storing machine readable and executable instructions such that the machine readable and executable instructions can be accessed by the processor component 208. The machine readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine readable and executable instructions and stored on the memory component 210. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory component 210 may include an HD map for autonomous driving of the vehicle 100.

The vehicle 100 may also include a driving assist component 214, and the data gathered by the sensor component 216 may be used by the driving assist component 214 to assist the navigation of the vehicle. The data gathered by the sensor component 216 may also be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, and the like. The information exchanged between vehicles may include information about a vehicle's speed, heading, acceleration, and other information related to a vehicle state.

The vehicle 100 also comprises the sensor component 216. The sensor component 216 is coupled to the communication path 224 and communicatively coupled to the processor component 208. The sensor component 216 may include, e.g., LiDAR sensors, RADAR sensors, optical sensors (e.g., cameras), laser sensors, proximity sensors, location sensors (e.g., GPS modules), and the like. In embodiments, the sensor component 216 may monitor the surroundings of the vehicle and may detect other vehicles and/or traffic infrastructure.

The vehicle 100 also comprises a communication module 220 that includes network interface hardware for communicatively coupling the vehicle 100 to the edge device 102 or the cloud server 140. The communication module 220 can be communicatively coupled to the communication path 224 and can be any device capable of transmitting and/or receiving data via a network or other communication mechanisms. Accordingly, the communication module 220 can include a communication transceiver for sending and/or receiving any wired or wireless communication. For example, the network interface hardware of the communication module 220 may include an antenna, a modem, a LAN port, a Wi-Fi card, a WiMAX card, a cellular modem, near-field communication hardware, satellite communication hardware, and/or any other wired or wireless hardware for communicating with other networks and/or devices.

The vehicle 100 also comprises a vehicle connectivity component 218 that includes network interface hardware for communicatively coupling the vehicle 100 to other connected vehicles. The vehicle connectivity component 218 can be communicatively coupled to the communication path 224 and can be any device capable of transmitting and/or receiving data via a network or other communication mechanisms. Accordingly, the vehicle connectivity component 218 can include a communication transceiver for sending and/or receiving any wired or wireless communication. For example, the network interface hardware of the vehicle connectivity component 218 may include an antenna, a modem, a LAN port, a Wi-Fi card, a WiMAX card, a cellular modem, near-field communication hardware, satellite communication hardware, and/or any other wired or wireless hardware for communicating with other networks and/or devices.

The vehicle 100 may connect with one or more other connected vehicles and/or external processing devices (e.g., the edge device 102) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A satellite component 222 is coupled to the communication path 224 such that the communication path 224 communicatively couples the satellite component 222 to other modules of the vehicle 100. The satellite component 222 may comprise one or more antennas configured to receive signals from global positioning system satellites. Specifically, in one embodiment, the satellite component 222 includes one or more conductive elements that interact with electromagnetic signals transmitted by global positioning system satellites. The received signal is transformed into a data signal indicative of the location (e.g., latitude and longitude) of the satellite component 222, and consequently, the vehicle 100.

The vehicle 100 may also include a data storage component that may be included in the memory component 210. The data storage component may store data used by various components of the vehicle 100. In addition, the data storage component may store data gathered by the sensor component 216, received from the edge device 102, and/or received from other vehicles. The data storage component may include an HD map for autonomous driving of the vehicle 100. The data storage component may include an HD map downloaded from the edge device 102 or the cloud server 104.

The vehicle 100 may also include an interface 226. The interface 226 may allow for data to be presented to a human driver and for data to be received from the driver. For example, the interface 226 may include a screen to display information to a driver, speakers to present audio information to the driver, and a touch screen that may be used by the driver to input information. The interface 226 may display a current route of the vehicle 100 or an HD map.

In some embodiments, the vehicle 100 may be communicatively coupled to the edge device 102 by a network 250. The network 250 may be a wide area network, a local area network, a personal area network, a cellular network, a satellite network, and the like.

The edge device 102 comprises a processor 230, a memory component 232, a communication module 234, a database 236, and a communication path 228. Each server component is similar in features to its connected vehicle counterpart, described in detail above (e.g., the processor 230 corresponds to the processor component 208, the memory component 232 corresponds to the memory component 210, the communication module 234 corresponds to the communication module 220, the database 236 corresponds to the database in the memory component 210, and the communication path 228 corresponds to the communication path 224). The memory component 232 may store a wireless channel status sensing unit 233, a task type analyzer 235, a needed HD map data information analyzer 237, and an HD map version decision agent 239. Each of the wireless channel status sensing unit 233, the task type analyzer 235, the needed HD map data information analyzer 237, and the HD map version decision agent 239 may be a program module in the form of operating systems, application program modules, and other program modules stored in the memory component 232.

The wireless channel status sensing unit 233 may be a program configured to measure a wireless channel status between the vehicle 100 and the edge device 102, e.g., a transmission rate between the vehicle 100 and the edge device 102. The task type analyzer 235 may be a program configured to analyze an HD map request from the vehicle 100 and identify the type of a task that the vehicle is going to perform. For example, FIG. 4 illustrates various task types that vehicles perform.

The needed HD map data information analyzer 237 may be a program configured to identify needed HD map information based on the identified task type. For example, by referring to FIG. 4, if the task type is path planning, the needed HD map data information analyzer 237 determines that a departure location, a destination location, and a road map of a city are needed HD map data information.

The HD map version decision agent 239 may be a program configured to determine an HD map version based on the wireless channel status and the needed HD map data information. For example, wireless channel status during a certain period may show a relatively high transmission rate and a task type may be safety guard. In this case, the needed HD map data information includes the locations of surrounding pedestrians and vehicles, the speed of surrounding vehicles, and the distance of surrounding vehicles, as shown in FIG. 4. Because the needed HD map data information is dynamic information not static information, the HD map does not need to include all information including static information. Specifically, by referring to FIG. 6, an HD map may consist of four layers including a highly dynamic layer 610, a transient dynamic layer 620, a transient static layer 630, and a permanent static layer 640. In this case, the needed map data information is included in the highly dynamic layer 610 and the transient dynamic layer 620. Thus, the HD map version decision agent 239 may determine an HD map version that includes only the highly dynamic layer 610 and the transient dynamic layer 620 as the one to be sent to the vehicle 100. Alternatively, because the wireless channel status shows a high transmission rate, the HD map version decision agent 239 may determine an HD map version that includes the highly dynamic layer 610, the transient dynamic layer 620, the transient static layer 630, and the permanent static layer 640 as the one to be sent to the vehicle 100.

If the wireless the channel status during a certain period shows relatively a low transmission rate and a task type is safety guard, the HD map version decision agent 239 may determine an HD map version that includes only the highly dynamic layer 610 and the transient dynamic layer 620 as the one to be sent to the vehicle 100.

The cloud server 140 includes one or more processors 240, one or more memory modules 242, a communication module 244, a data storage component 246, and a communication path 248. The components of the cloud server 140 may be structurally similar to and have similar functions as the corresponding components of the edge device 102 (e.g., the one or more processors 240 corresponds to the processor 230, the one or more memory modules 242 corresponds to the memory component 232, the communication module 244 corresponds to the communication module 234, the data storage component 246 corresponds to the database 236, and the communication path 248 corresponds to the communication path 228).

Figure 3:
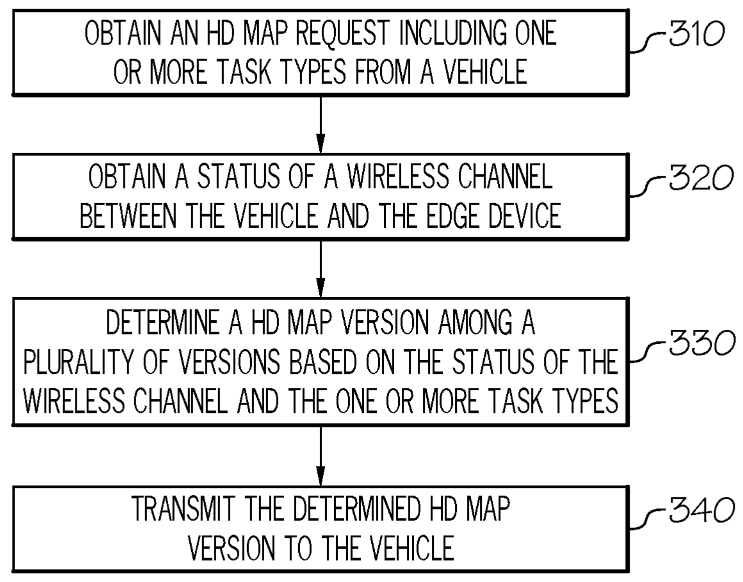
FIG. 3 depicts a flowchart for determining an HD map version and providing the determined HD map version to a vehicle is depicted, according to one or more embodiments shown and described herein.

Referring now to FIG. 3, a flowchart for determining an HD map version and providing the determined HD map version to a vehicle is depicted. The flowchart will be described with reference to FIGS. 1, 4, 6, and 7.

In step 310, an edge device obtains an HD map request including one or more task types from a vehicle. In embodiments, by referring to FIG. 1, the edge device 102 receives an HD map request including one or more task types from the vehicle 100. The one or more task types may be one or more tasks depicted in FIG. 4. For example, the vehicle 100 may transmit a request for an HD map for performing safety guard to the edge device 102 during a period 716 shown in FIG. 7.

Figure 7:
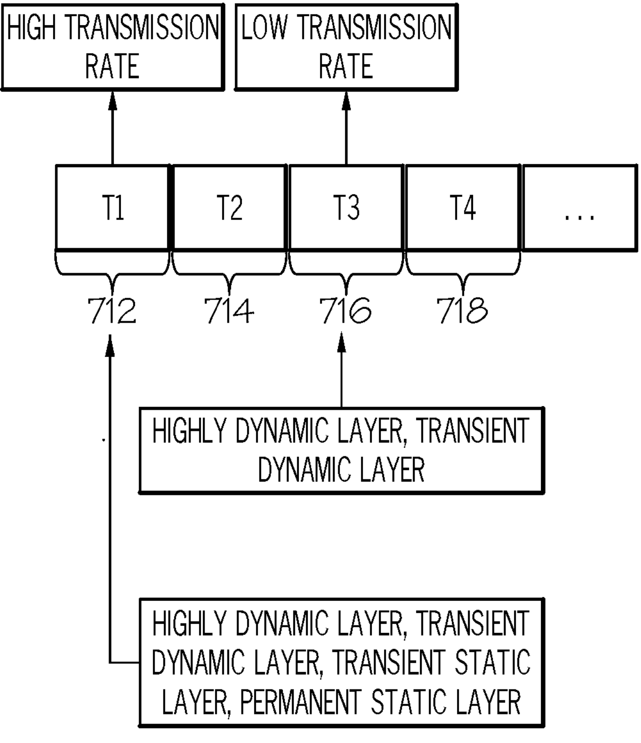
FIG. 7 depicts transmissions periods and data transmitted during corresponding periods, according to one or more embodiments shown and described herein.

By referring back to FIG. 3, in step 320, the edge device obtains a status of a wireless channel between the vehicle and the edge device. In embodiments, the edge device 102 obtains a status of the wireless channel between the vehicle 100 and the edge device 102. For example, the wireless channel status sensing unit 233 of the edge device 102 finds a low transmission rate between the edge device 102 and the vehicle 100 during the period 716 as shown in FIG. 7.

By referring back to FIG. 3, in step 330, the edge device determines an HD map version among a plurality of HD map versions based on the status of the wireless channel and the one or more task types. In embodiments, the HD map version decision agent 239 of the edge device 102 may determine an HD map version based on the wireless channel status and the needed HD map data information. For example, wireless channel status during the period 716 may show a relatively low transmission rate and a task type may be safety guard. In this case, the needed HD map data information includes the locations of surrounding pedestrians and vehicles, the speed of surrounding vehicles, and the distance of surrounding vehicles as shown in FIG. 4. Because the needed HD map data information is dynamic information not static information, the HD map does not need to include all information including static information. In this case, the needed map data information is included in the highly dynamic layer 610 and the transient dynamic layer 620. Thus, the HD map version decision agent 239 may determine an HD map version that includes only the highly dynamic layer 610 and the transient dynamic layer 620 as the one to be sent to the vehicle 100.

As another example, the wireless channel status during the period 716 may show a relatively low transmission rate and a task type may be real-time path monitoring. In this case, the needed HD map data information includes the traffic of a planned path, accident locations, and weather of the planned path as shown in FIG. 4. In this example, the needed map data information is included in the highly dynamic layer 610 and the transient static layer 630 in FIG. 6. Thus, the HD map version decision agent 239 may determine an HD map version that includes only the highly dynamic layer 610 and the transient static layer 630 as the one to be sent to the vehicle 100.

As another example, the wireless channel status during the period 712 may show a relatively high transmission rate and a task type may be lane changing. In this example, the needed HD map data information includes the speed of surrounding vehicles, the distance of surrounding vehicles, the current speed, the current weather, and the speed limit, as shown in FIG. 4. Because the needed HD map data information includes both dynamic information and static information, the HD map needs to include all information including static information. Thus, the HD map version decision agent 239 may determine an HD map version that includes the highly dynamic layer 610, the transient dynamic layer 620, the transient static layer 630, and the permanent static layer 640 as the one to be sent to the vehicle 100.

As another example, the wireless channel status during the period 716 may show a relatively low transmission rate and a task type may be lane changing. In this example, the needed HD map data information includes the speed of surrounding vehicles, the distance of surrounding vehicles, the current speed, the current weather, and the speed limit, as shown in FIG. 4. Because the needed HD map data information includes both dynamic information and static information, the HD map needs to include all information including static information. However, because the transmission rate between the edge device 102 and the vehicle 100 is relatively low, the transmission of the HD map that includes all information such as the four layers in FIG. 6 to the vehicle 100 cannot be completed during the period 716. Thus, the HD map version decision agent 239 may determine an HD map version that includes less information than the HD map version that includes the four layers in FIG. 6. For example, the HD map version decision agent 239 may determine an HD map version that includes the highly dynamic layer 610 and the transient dynamic layer 620 as the one to be transmitted to the vehicle 100. The determined HD map version may be completely transmitted from the edge device 102 to the vehicle 100 during the period 716. As another example, the HD map version decision agent 239 may determine an HD map version that includes the highly dynamic layer 610, the transient dynamic layer 620, and the transient static layer 630 as the one to be transmitted to the vehicle 100. As another example, the HD map version decision agent 239 may determine an HD map version that includes the highly dynamic layer 610, the transient dynamic layer 620 and the permanent static layer 640 as the one to be transmitted to the vehicle 100.

As another example, the wireless channel status during the period 716 may show a relatively low transmission rate and a task type may be path planning. In this example, the needed HD map data information includes a departure location, a destination location, and a road map of a city, as shown in FIG. 4. In this example, the HD map version decision agent 239 may determine an HD map version that includes minimal information, for example, an HD map that includes the transient static layer 630 only or the permanent static layer 640 only as the one to be transmitted to the vehicle 100.

While the edge device 102 determines an HD map version as described above, in some embodiments, the vehicle 100 may determine an HD map version based on the wireless channel status and the task to be performed by the vehicle 100 and transmit a request for the determined HD map version to the edge device 102. For example, the vehicle 100 may transmit a request for an HD map version that includes the highly dynamic layer 610 and the transient dynamic layer 620 only, to the edge device 102.

By refereeing back to FIG. 3, in step 340, the edge device transmits the determined HD map version to the vehicle. In embodiments, the edge device 102 transmits the determined HD map version to the vehicle 100. For example, during the period 712, the edge device 102 may transmit the determined HD map version that includes the highly dynamic layer 610, the transient dynamic layer 620, the transient static layer 630, and the permanent static layer 640. During the period 716, the edge device 102 may transmit the determined HD map version that includes the highly dynamic layer 610 and the transient dynamic layer 620.

FIG. 4 depicts a plurality of task types and needed information corresponding to the tasks and specific examples of the needed information, according to one or more embodiments shown and described herein.

FIG. 5 depicts specific parameters and examples that are needed for an HD map, according to one or more embodiments shown and described herein.

Figure 6:
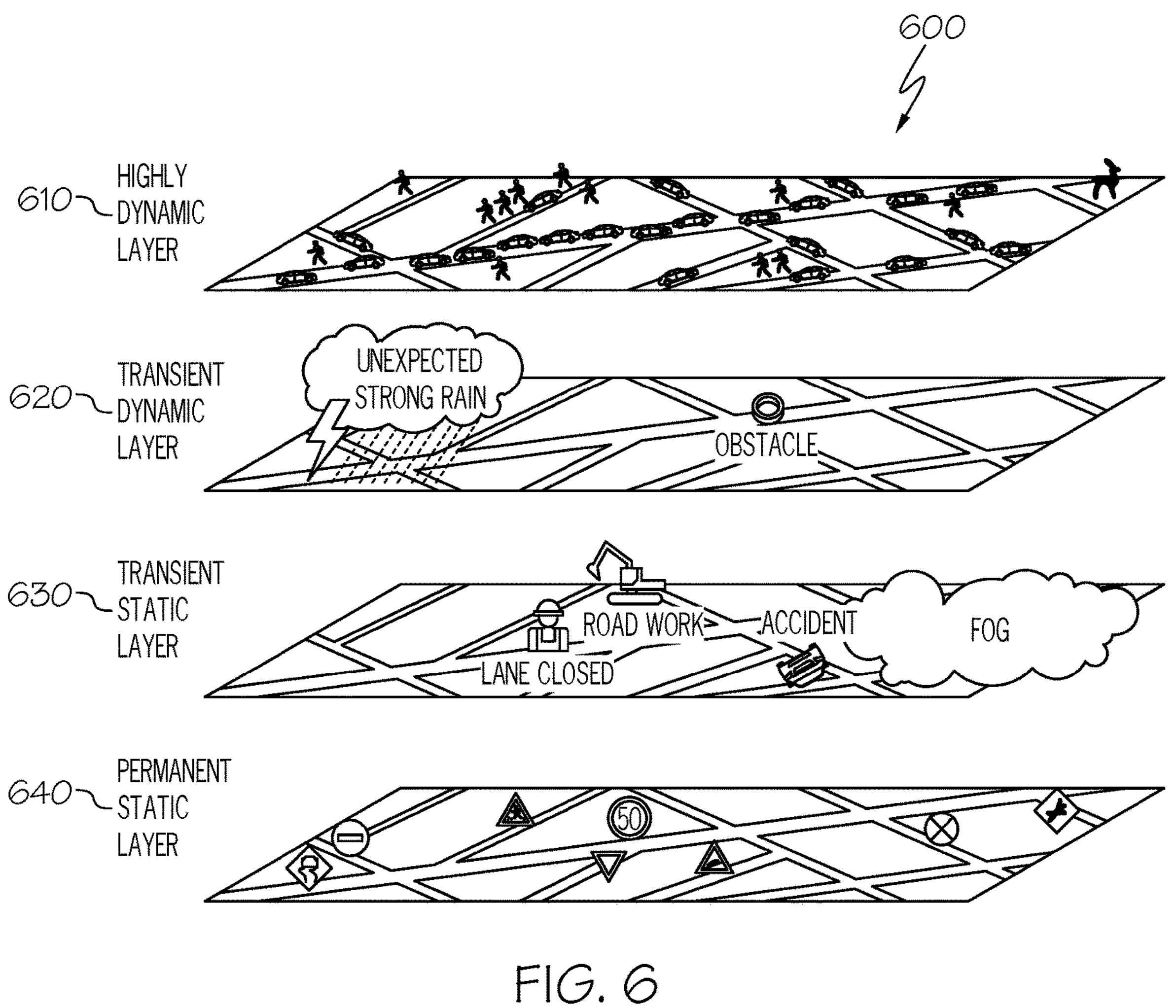
FIG. 6 depicts an HD map consisting of four layers, according to one or more embodiments shown and described herein.

FIG. 6 depicts four layers of an HD map, according to one or more embodiments shown and described herein. The HD map includes a highly dynamic layer 610, a transient dynamic layer 620, a transient static layer 630, and a permanent static layer 640. The highly dynamic layer 610 includes dynamic moving information about vehicles such as locations, speeds, accelerations, distances among vehicles, moving information about pedestrians and animals, and the like. The transient dynamic layer 620 includes local transient weather such as unexpected strong rain in a limited area and information about obstacles. The transient static layer 630 includes information about accidents, constructions, lane closure, and information about transient weather such as fog in a certain area. The permanent static layer 640 includes speed limit information and any other road sign information such as stop signs, do not enter signs, one way signs, and the like. While FIG. 6 depicts four layers of an HD map, the HD map may include more than or less than four layers.

FIG. 7 depicts transmissions periods and data transmitted during corresponding periods, according to one or more embodiments shown and described herein. For each of the periods 712, 714, 716, 718, the transmission of an RD map from the edge device 102 to the vehicle 100 should be completed if the vehicle 100 requested for an HD map for performing a task. In this example, a high transmission rate is available during the periods 712 and 718 and a low transmission rate is available during the periods 714 and 716. During the periods 712 and 718, a relatively large sized HD map, e.g., the HD map that includes the four layers in FIG. 6, can be completely transmitted from the edge device 102 to the vehicle 100. During the periods 714 and 716, a relatively small sized HD map, e.g., the HD map that includes the highly dynamic layer 610 and the transient dynamic layer 620 may be transmitted from the edge device 102 to the vehicle 100 due to the low transmission rate.

Figure 8:
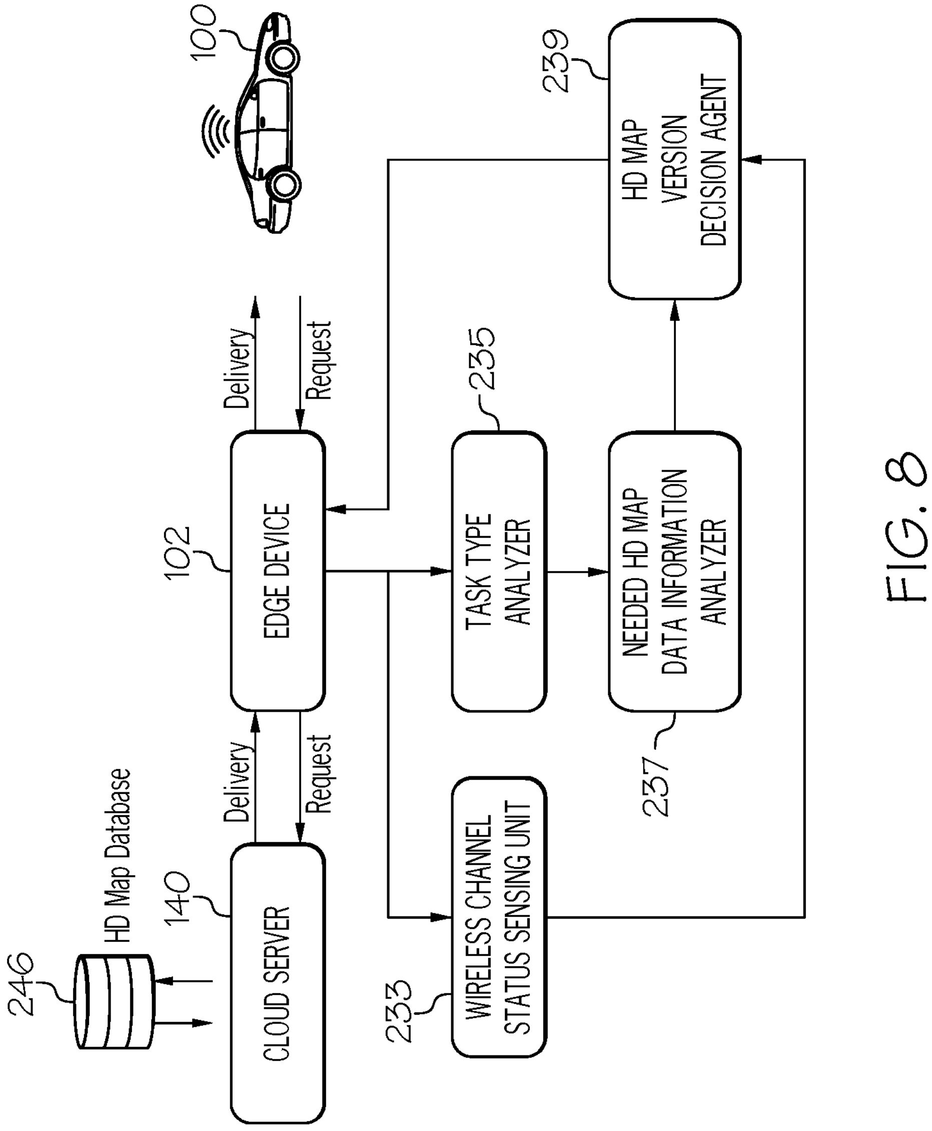
FIG. 8 depicts an overall system block diagram, according to one or more embodiments shown and described herein.

FIG. 8 depicts an overall system block diagram, according to one or more embodiments shown and described herein. In embodiments, the vehicle 100 transmits a request for an HD map along with information about a task to be performed to the edge device 102. The wireless channel status sensing unit 233 of the edge device 102 measures a wireless channel status between the vehicle 100 and the edge device 102, e.g., a transmission rate between the vehicle 100 and the edge device 102. The task type analyzer 235 of the edge device identifies the type of a task that the vehicle is going to perform based on the request for the HD map received from the vehicle 100. For example, the task type analyzer 235 may identify one of the path planning task, the real-time path monitoring task, the safety guard task, and the lane changing task based on the request from the vehicle 100.

The needed HD map data information analyzer 237 receives the identified task type from the task type analyzer 235 and identifies needed HD map information based on the identified task type. For example, by referring to FIG. 4, if the task type is a safety guard task, the needed HD map data information includes the locations of surrounding pedestrians and vehicles, the speed of surrounding vehicles, and the distance of surrounding vehicles as shown in FIG. 4.

Referring back to FIG. 8, the HD map version decision agent 239 receives the wireless channel status and the needed HD map information and determines an HD map version based on the wireless channel status and the needed HD map data information. For example, if the transmission rate of the wireless channel is relative low, the HD map version decision agent 239 may determine an HD map version that includes only the highly dynamic layer 610 and the transient dynamic layer 620 as the one to be sent to the vehicle 100. If the transmission rate of the wireless channel is relatively high, the HD map version decision agent 239 may determine an HD map version that includes the highly dynamic layer 610, the transient dynamic layer 620, the transient static layer 630, and the permanent static layer 640 as the one to be sent to the vehicle 100.

Then, the edge device 102 determines whether the determined HD map version is stored in the edge device 102. If the determined HD map version is stored in the edge device 102, the edge device 102 delivers the determined HD map version to the vehicle 100. If the determined HD map version is not stored in the edge device 102, the edge device 102 transmits a request for the determined HD map version to the cloud server 140. Then, the cloud server 140 retrieves the determined HD map version from the data storage component or HD map database 246 and delivers the determined HD map version to the edge device 102.

Figure 9:
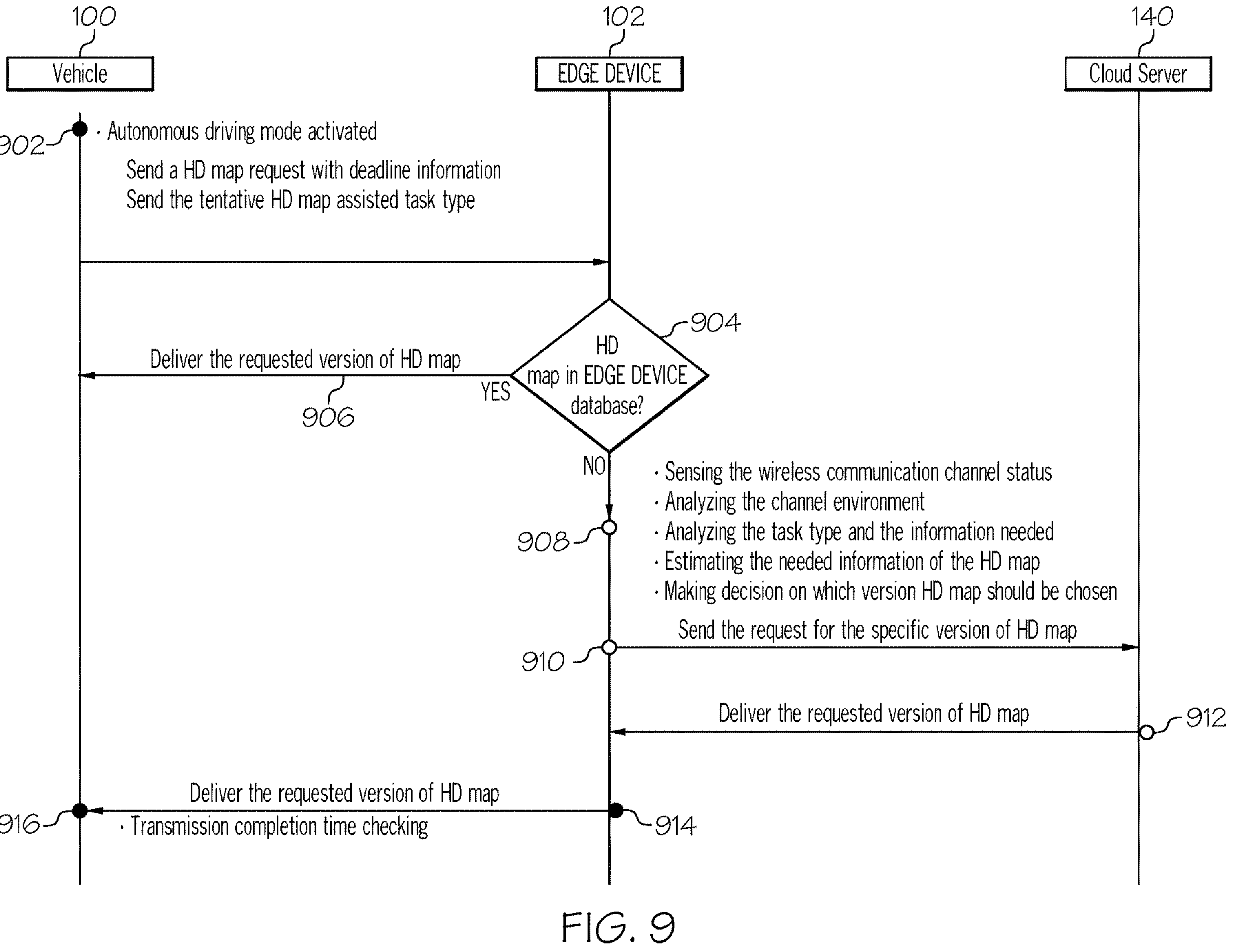
FIG. 9 depicts an overall system sequence chart, according to one or more embodiments shown and described herein.

FIG. 9 depicts an overall system sequence chart, according to one or more embodiments shown and described herein.

In step 902, the autonomous driving mode of the vehicle 100 is activated. The vehicle 100 sends a request for an HD map to the edge device 102 along with deadline information. The deadline information includes a deadline for receiving the requested HD map so that the vehicle 100 can continue to drive autonomously. The vehicle 100 also sends a tentative HD map assisted task type, e.g., a path planning task, a real-time path monitoring task, a safety guard task, and a lane changing task.

In step 904, the edge device 102 determines whether an HD map version is stored in the edge device database. The edge device 102 may determine the HD map version based on the wireless channel status and the task type to be performed by the vehicle 100. Alternatively, the HD map version may be specified by the vehicle.

If the requested HD map version is stored in the edge device database and the requested HD map version can be completely transmitted to the vehicle 100 by the deadline specified by the vehicle 100, then the edge device 102 delivers the requested HD map version to the vehicle 100 in step 906. If the requested HD map version is stored in the edge device database and the requested HD map version cannot be completely transmitted to the vehicle 100 by the deadline specified by the vehicle 100, then the edge device 102 may transmit an HD map version that stores less data, but includes enough information for performing the task. Alternatively, the edge device 102 may not transmit an HD map and inform the vehicle 100 that the requested HD map cannot be delivered by the deadline.

If the requested HD map version is not stored in the edge device database, the edge device 102 determines an HD map version to be sent to the vehicle 100 in step 908 and sends a request for the requested HD map version to the cloud server 140 in step 910. Specifically, the edge device 102 obtains the wireless communication channel status by analyzing channel environment. The edge device 102 also identifies a task type from the HD map request received from the vehicle 100 and estimates needed information of the HD map based on the task type. Based on the needed information and the wireless communication channel status, the edge device 102 determines which HD map version should be chosen. Then, the edge device 102 transmit a request for the determined HD map version to the cloud server 140. The cloud server 140 delivers the requested HD map version to the edge device 102 in step 912. Then, the edge device 102 delivers the requested HD map version to the vehicle 100 in step 914. The vehicle 100 and/or the edge device 102 checks the transmission completion time in step 916.

The present disclosure provides an edge device that obtains an HD map request including one or more task types from a vehicle, obtains a status of a wireless channel between the vehicle and the edge device, determines an HD map version among a plurality of versions based on the status of the wireless channel and the one or more task types, and transmits the determined HD map version to the vehicle. The present system provides optimal HD map data to a vehicle based on the task type requested by the vehicle and the wireless communication channel status between an edge device and the vehicle. In this regard, the edge device may provide appropriate HD map data to the vehicle by the deadline specified by the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An edge device comprising:

a controller programmed to:

obtain an HD map request including a task type of operating a vehicle from the vehicle;

obtain a status of a wireless channel between the vehicle and the edge device;

determine an HD map version among a plurality of HD map versions based on the status of the wireless channel and the task type of operating the vehicle, each of the plurality of HD map versions including different one or more layers of an HD map;

determine whether the determined HD map version is stored in a database of the edge device;

transmit a request for the determined HD map version to a cloud server in response to determining that the determined HD map version is not stored in the database; and transmit the determined HD map version to the vehicle in response to determining that the determined HD map version is stored in the database.

2. The edge device of claim 1, wherein the controller is further programed to:

determine needed information based on the task type;

selecting, out of an HD map consisting of a highly dynamic layer, a transient dynamic layer, a transient static layer, and a permanent static layer, one or more layers that include the needed information; and determine the HD map version consisting of the selected one or more layers.

3. The edge device of claim 2, wherein the needed information comprises at least one of a departure location, a destination location, a road map, a traffic of a planned path, an accident location, weather of the planned path, locations of surrounding pedestrians and vehicles, speeds of surrounding vehicles, distances among surrounding vehicles, a current speed of the vehicle, current weather information, and a speed limit.

4. The edge device of claim 1, wherein the determined HD map version includes one or more layers of a highly dynamic layer, a transient dynamic layer, a transient static layer, and a permanent static layer.

5. The edge device of claim 1, wherein the task type includes one of a path planning task, a real-time path monitoring task, a safety guard task, and a lane changing task.

6. The edge device of claim 1, wherein the controller is further programed to:

obtain deadline information for a delivery of an HD map; and determine the HD map version among a plurality of versions based on the status of the wireless channel, the task type, and the deadline information.

7. The edge device of claim 1, wherein the status of the wireless channel includes information about a transmission rate during a period.

8. A method comprising:

obtaining an HD map request including a task type of operating a vehicle from the vehicle;

obtaining a status of a wireless channel between the vehicle and an edge device;

determining an HD map version among a plurality of HD map versions based on the status of the wireless channel and the task type of operating the vehicle, each of the plurality of HD map versions including different one or more layers of an HD map;

determining whether the determined HD map version is stored in a database of the edge device;

transmitting a request for the determined HD map version to a cloud server in response to determining that the determined HD map version is not stored in the database; and transmitting the determined HD map version to the vehicle in response to determining that the determined HD map version is stored in the database.

9. The method of claim 8, further comprising:

determining needed information based on the task type;

selecting, out of an HD map consisting of a highly dynamic layer, a transient dynamic layer, a transient static layer, and a permanent static layer, one or more layers that include the needed information; and determining the HD map version consisting of the selected one or more layers.

10. The method of claim 9, wherein the needed information comprises at least one of a departure location, a destination location, a road map, a traffic of a planned path, an accident location, weather of the planned path, locations of surrounding pedestrians and vehicles, speeds of surrounding vehicles, distances among surrounding vehicles, a current speed of the vehicle, current weather information, and a speed limit.

11. The method of claim 8, wherein the determined HD map version includes one or more layers of a highly dynamic layer, a transient dynamic layer, a transient static layer, and a permanent static layer.

12. The method of claim 8, wherein the task type includes one of a path planning task, a real-time path monitoring task, a safety guard task, and a lane changing task.

13. The method of claim 8, further comprising:

obtaining deadline information for a delivery of an HD map; and determining the HD map version among a plurality of versions based on the status of the wireless channel, the task type, and the deadline information.

14. A system comprising:

a vehicle; and an edge device comprising a controller programmed to:

obtain an HD map request including a task type of operating the vehicle from the vehicle;

obtain a status of a wireless channel between the vehicle and the edge device;

determine an HD map version among a plurality of HD map versions based on the status of the wireless channel and the task type of operating the vehicle, each of the plurality of HD map versions including different one or more layers of an HD map;

determine whether the determined HD map version is stored in a database of the edge device;

transmit a request for the determined HD map version to a cloud server in response to determining that the determined HD map version is not stored in the database; and transmit the determined HD map version to the vehicle in response to determining that the determined HD map version is stored in the database, wherein the vehicle drives autonomously based on the determined HD map version.

15. The system of claim 14, wherein the controller is programed to:

determine needed information based on the task type; and determine the HD map version based on the needed information.

16. The edge device of claim 1, wherein the controller is further programed to:

determine whether the determined HD map version can be completely transmitted to the vehicle by a deadline specified the vehicle; and transmit another HD map version that stores less data than the determined HD map version to the vehicle in response to determining that the determined HD map version cannot be completely transmitted to the vehicle by a deadline specified the vehicle.

17. The method of claim 8, further comprising:

determining whether the determined HD map version can be completely transmitted to the vehicle by a deadline specified the vehicle; and transmitting another HD map version that stores less data than the determined HD map version to the vehicle in response to determining that the determined HD map version cannot be completely transmitted to the vehicle by a deadline specified the vehicle.

18. The system of claim 14, wherein the controller is further programed to:

determine whether the determined HD map version can be completely transmitted to the vehicle by a deadline specified the vehicle; and transmit another HD map version that stores less data than the determined HD map version to the vehicle in response to determining that the determined HD map version cannot be completely transmitted to the vehicle by a deadline specified the vehicle.

* * * * *